United States Patent

Peres et al.

[11] Patent Number: 5,867,496
[45] Date of Patent: Feb. 2, 1999

[54] INTERFACE DEVICE

[75] Inventors: Mauricio Peres, Ottawa; Mel Roberts, Stittsville, both of Canada

[73] Assignee: Mitel Corporation, Kanata, Canada

[21] Appl. No.: 640,953
[22] PCT Filed: Nov. 18, 1994
[86] PCT No.: PCT/CA94/00638
   § 371 Date: Oct. 1, 1996
   § 102(e) Date: Oct. 1, 1996
[87] PCT Pub. No.: WO95/14361
   PCT Pub. Date: May 26, 1995

[30] Foreign Application Priority Data

Nov. 19, 1993 [CA] Canada ................................. 2109534

[51] Int. Cl.⁶ ...................... H04Q 11/04; H04M 11/00
[52] U.S. Cl. .................... 370/376; 370/421; 370/463; 370/468; 370/545; 379/93.05; 379/399
[58] Field of Search ....................... 370/357–360, 370/366, 375, 402, 376, 419–421, 463, 465, 468, 485, 503, 486, 508, 516, 517, 538, 545, 911, 489, 490, 498, 542–544; 379/93.01, 93.05, 93.07, 350, 399

[56] References Cited

U.S. PATENT DOCUMENTS 5,497,373  3/1996  Hulen et al. ............................. 370/419
5,533,017  7/1996  Thor ....................................... 370/419

*Primary Examiner*—Douglas W. Olms
*Assistant Examiner*—Seema S. Rao
*Attorney, Agent, or Firm*—Marks & Clerk

[57] ABSTRACT

An interface device serving as a bridge between a telephone-based bus with a plurality of TDM channels and a high speed data network to permit mixed data, voice, and video signals to be exchanged between the telephone bus and the data network, comprises a serial port for connection to the telephone bus; a parallel port for connection to the high speed data network; a bidirectional serial-to-parallel/parallel-to-serial converter connected to the serial port; and a rate converter circuit between the bidirectional converter and said parallel port, the rate converter circuit including a time-slot interchange device to permit rate adaptation with constant throughput delay and switching between the TDM channels.

10 Claims, 3 Drawing Sheets

INTERFACE DEVICE

This invention relates to interface devices, and more particularly to an drop/add switch device serving as a bridge between a telephone bus with a plurality of TDM (time division multiplex) channels and a high speed synchronous time division multiplexed (TDM) network to permit the transport of mixed data, voice, and video signals.

Many businesses now have installed local area networks (LANs). A typical LAN is Ethernet, which is a 10 Mb/s asynchronous communications medium permitting the exchange of data between many users. Particularly, a LAN is used to interconnect personal computers so as to permit many users to work with the same data. However, multi-media applications cannot be networked with an acceptable quality and they are incompatible with existing telephone applications. Furthermore, the available bandwidth is insufficient for evolving applications.

In an attempt to address this problem, a new LAN referred to as "Iso-Ethernet" has been introduced. This adds an extra 6 Mb/s of isochronous bandwidth to the existing 10 Mb/s asynchronous network. Although Iso-Ethernet makes use of the existing cabling, the scheme has an inherent bandwidth limitation.

Today, speeds of up to 155 Mb/s can be achieved using transmission links based on twisted pair wires or optical fiber links. These are isochronous TDM (time division multiplex) backbones capable of carrying mixed, data, voice and video signals. The high speed devices used to perform the framing functions are serial-to-parallel and parallel-to-serial converters having an up-front line interface circuit designed in ECL or Bipolar technologies to handle the high speed serial link and CMOS circuitry to transmit and receive data on a parallel backbone plane.

Popular framers currently available that perform such functions are Transwitch SYN-155 and AMCC/PMC S3005/6. One widely used telephone backplane is the present applicants Mitel STBUS, which operates at a speed of 2.048 Mb/s. This has thirty-two 64 Kb/s channels.

An object of the present invention is to permit existing telephone buses, such as the Mitel STBUS, to be interfaced with high speed TDM networks ranging from 16 Mb/s to 155 Mb/s.

Accordingly, the present invention provides an interface device serving as a bridge between a telephone-based bus with a plurality of TDM channels and a high speed synchronous digital network and providing per channel direction control to permit mixed data, voice, and video signals to be exchanged between the telephone bus and the high speed synchronous digital network, comprising a serial port for connection to the telephone bus; bidirectional serial-to-parallel/parallel-to-serial converter means connected to said serial port; a port for connection to a high speed framer that assembles frames for said high speed synchronous digital network, said port for connection to a high speed framer being a parallel port for direct connection to a parallel backplane of the high speed framer over a parallel bus; a rate converter circuit provided between said bidirectional converter means and said parallel port, said rate converter circuit including time-slot interchange means adapted to permit rate adaptation with constant throughput delay and switching between said TDM channels; and a microprocessor controlling time slot assignments in said time-slot interchange means.

The device can be described as a switch that allows both voice and data to be time-slot interchanged with constant delay within a frame. It will work as the interface between existing 2 Mb/s STBUS interface (from DNICs, Trunks, codecs) to different Fiber Interface Modules with serial backplanes operating at 16, 51 or 155 Mb/s. Since existing high speed framers provide an 8-bit parallel backplane as user data interface, the device can interface to the framers using an 8-bit parallel backplane that will transmit/receive 64 Kb/s channels at 2.048, 6.48 or 19.44 Mbyte/s. Narrow-band 64 kbit/s channels can be mapped to accommodate the required bandwidth pipe for the application.

The device may also incorporate a direct interface to higher speed STBUS backplanes such as 4 and 8 Mb/s, per-channel direction control and programmable 8 KHz frame synchronized pulse format.

The device can be used in general OC-1 and OC-3 multiplexer applications. Its main function is to provide Time Slot Assignment with constant delay to allow voice and concatenated data to be time-interchanged between the system and the Network fiber interfaces without losing frame integrity. The device may operate at parallel data speeds of 6.48 and 19.44 Mbytes/s.

The switching mechanism within the device must have the constant delay property in order to guarantee the integrity of concatenated data channels whenever switching is performed across the system due to the minimum requirements defined for voice/data applications in both narrow and broad band ISDN, where the use of concatenated 64 Kb/s channel is very common.

The drop/add switch is suitable for use in work-group environments to allow multi-service applications to be created on demand.

The invention will now be described in more detail, by way of example only, with reference to the accompanying drawings, in which.

Figure 1:
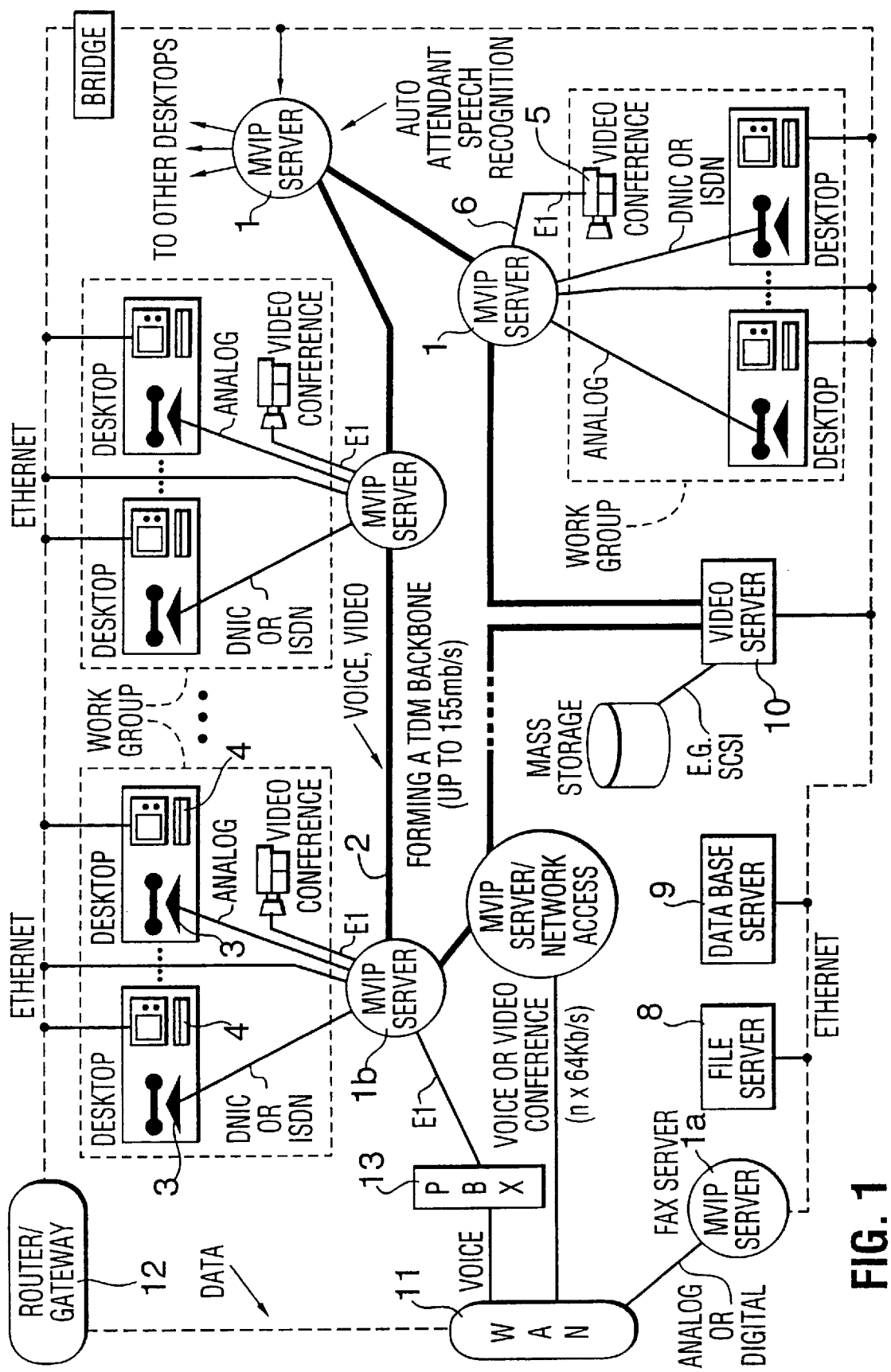
FIG. 1 is a general diagram of a wide area network with a 155 mb/s synchronous TDM backbone employing MVIP servers incorporating devices in accordance with the invention.

Referring now to FIG. 1, the distributed network comprises MVIP (multi-vendor integration protocol) servers 1 interconnected by high speed TDM links 2 operating at speeds of up to 155 Mb/s. The servers 1 are connected via analog or digital links to telephones 3, personal computers 4 and video conference devices 5. The video conference devices 5 are connected by TDM links 6 to a local server 1. File server 8, and data base server 9 may be connected to Ethernet 7. Server 1a is connected to wide area network 11, which is connected to router/gateway 12 and PBX 13. PBX 13 is connected over an E1 link to MVIP server 1b. It will be appreciated that the layout shown in FIG. 1 is arbitrary and can be configured to meet customer requirements.

Figure 2:
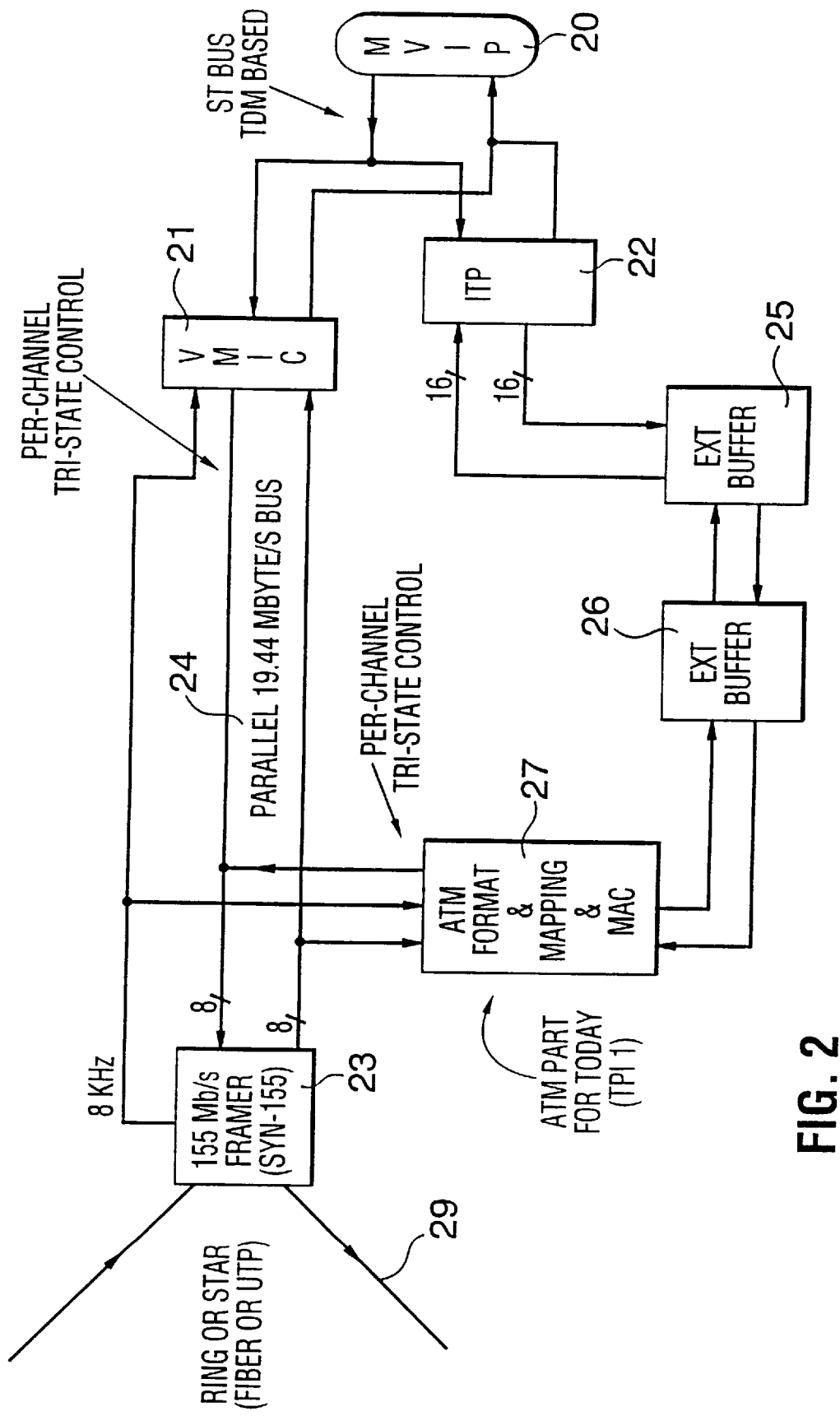
FIG. 2 is a block diagram showing the use of a device in accordance with the invention as an interface between a high speed synchronous TDM link and an STBUS.

Referring now to FIG. 2, a telecom server includes a MVIP (multi-vendor integration protocol) header incorporating a TDM-based STBUS 20. The ST-bus 20 is connected to the VMIC (voice/MVIP interface) drop/add device 21 in accordance with the invention and also an ITP (Isochronous to Packet Converter) unit 22. The drop/add device 21 is connected to a 155 Mb/s framer (SYN-155) 23 over a parallel 19.44 Mbyte/s bus 24. The framer 23 can be connected in a ring or star configuration in a fiber-optic TDM network.

ITP unit 22 is also connected through external buffers 25 and 26 to ATM (asynchronous transmission mode) format and mapping unit 27. The ITP unit 22 assembles the data from the ST-bus into packets for subsequent assembly into ATM cells in the TPI unit 27.

The signaling and/or data transfers take place over the ATM network (25 to 27), whereas voice/video transfers are transported through the TDM network and the interface device 21 in accordance with the invention.

Figure 3:
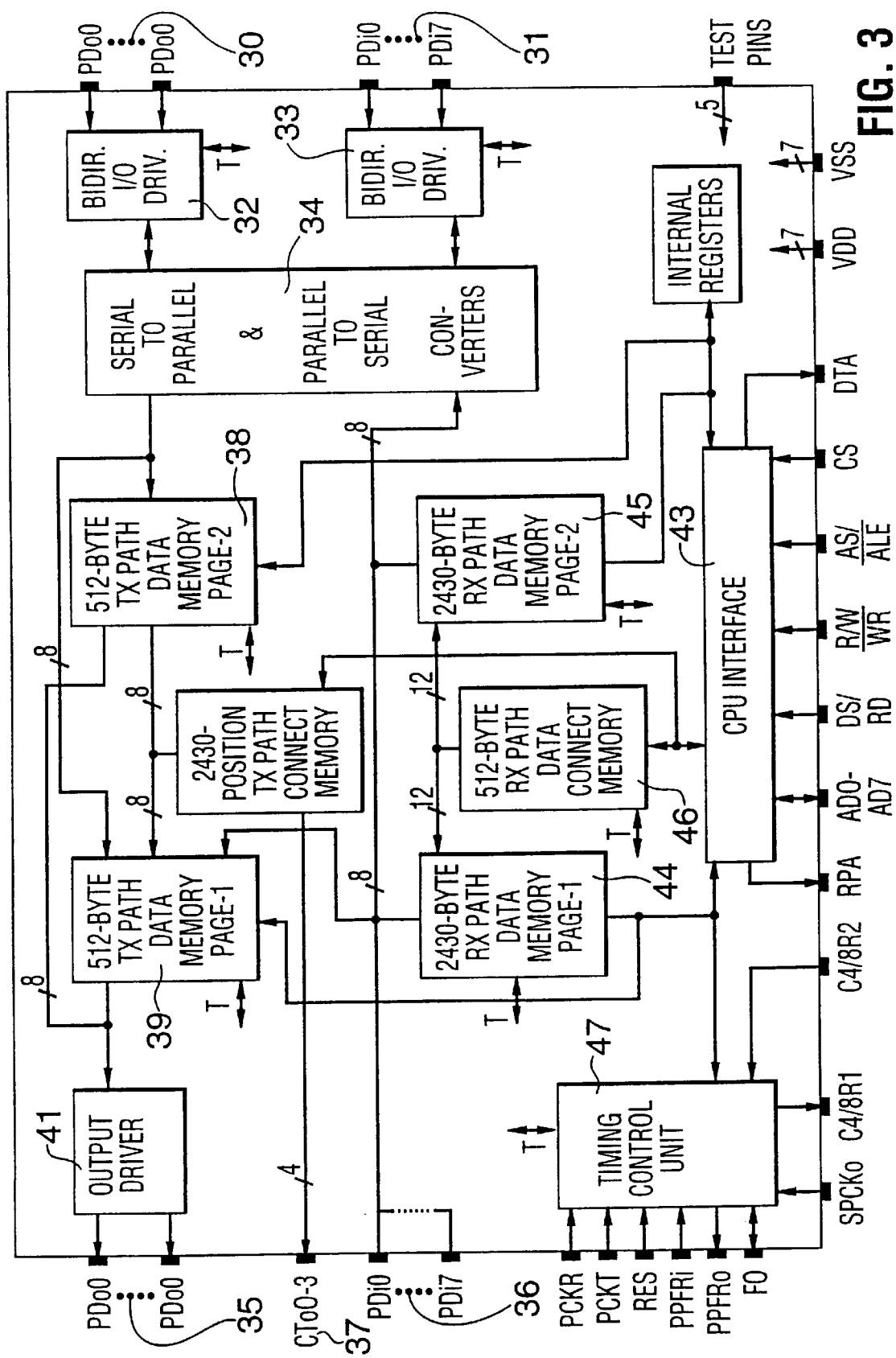
FIG. 3 is a block diagram of an interface device in accordance with the invention.

Referring now to FIG. 3, this shows a block diagram of the drop/add device 21 in accordance with the invention. The device comprises serial input ports 30 and serial output ports 31 for connection to a telephone bus, such as a Mitel STBUS. Ports 30, 31 are connected to respective bidirectional I/O drivers 32, 33, which in turn are connected to serial-to-parallel and parallel-to-serial converter unit 34. The drop/add device has a parallel output port 35 and a parallel input port 36 for connection to a parallel 19.44 Mbyte/s bus connected to high speed framer 23.

The interface device also has a control output port 37 generating output signals on a per channel basis to control time slot access from other devices on the parallel bus. This allows other devices to share the same parallel bus in order to access the high speed serial link 29.

The serial-to-parallel converter of unit 34 is connected through a transmit path consisting of 512-byte data memory modules 38, 39 through output driver 41 to parallel output port 35. Such memory modules are similar, for example, to Mitel 8980 devices. A 2430-position transmit path connect memory 42 controlled by microprocessor 43 stores the time slot assignments in the memory modules 38, 39.

Generally, parallel input port 36 is connected to a parallel-to-serial converter of unit 34. Memory modules 44 and 45 store the time slots in the receive path and memory module 46 stores the time slot assignment pattern data.

CPU interface 43 is connected to timing control unit 47 and an external microprocessor (not shown). The device 21 receives 8 Khz timing signals from the high speed framer as shown in FIG. 2.

The interface device allows system designers to build new applications and system interconnection at speeds up to 155 Mb/s. The described device is designed to switch 64 Kbit/s or wideband N×64 Kb/s channels from a Serial Data Port (SDP) compatible to Mitel STBUS interface to a Parallel Data Port (connected to high speed framers) and vice versa. The Parallel Data Port is designed to accept a variety of data speeds up to 20 Mbyte/s.

Since the parallel and serial ports of the device operate at different rates, an internal rate converter circuit associated with a multiple buffer time interchange block is employed to achieve the rate adaptation between the two ports. The internal time interchange block allows the switching of 512 channels on an MVIP interface in different directions. To allow this application, the device provides per channel direction control on the 16 serial streams. For example, in some applications the complete 512 channels of the MVIP interface can be time interchanged to the parallel port side. In the opposite direction, 512 channels coming from the parallel port can be dropped or time interchanged to the MVIP side.

The programming of the device serial interface port through interface Mode Selection register allows the device to be used in either STBUS, GCI and general TDM interfaces with data rates up to 8.192 Mb/s. The device's clock synchronization and reference is dependent on-the "timing mode" selected in the interface Mode Selection register. The "timing mode" options provided by the VMIC device allow many applications and topologies when isochronous TDM backbones are required. The device can be applied on MVIP interchassis connections utilizing star or ring architectures.

When the device operates in a ring type of application, it provides a special mode called Parallel Data Bypass which allows the full or part of the received input parallel data to be bypassed to the output parallel port feeding the ring back with the data which is not destined (to be dropped) to the local station. The data destined to the local station can be dropped through CPU programming. In this mode, the CPU has the full control on managing the outgoing bandwidth (from the ST-bus to the high speed TDM frame.) so that it does not contend with the bypassed data. The CPU can establish what are the channels which are not bypassed from the parallel input to the parallel output on a per channel basis.

In ring configurations, a common problem is the build-up of timing jitter due to the need to regenerate clock signals around the ring. The device includes elastic buffering to absorb different delays built up in the ring.

For access to the STBUS/MVIP serial channels, the device can be configured as a data or message memory with fast memory access times. By using the Mitel message mode, the microprocessor can access serial input and output TDM data on a per channel basis to control devices such as the MITEL MT8972, MT8930, and T1/CEPT trunk interfaces through the STBUS interface.

It will thus be seen that the described interface device performs N×64 Kb/s time slot interchange with constant throughput delay. This guarantees integrity when switching wideband channels up to 8.192 Mbits/s. Simultaneously to the time slot interchange options, the device performs rate conversion between conventional 2.048, 4.096 and 8.192 Mb/s time division multiplex serial links to an 8-bit parallel bus which can be programmed to operate at various data rates. These rates are compatible to existing parallel backplanes employed in high speed parallel-to-serial and serial-to-parallel converters allowing the VMIC to provide full rate adaptation from low speed (2, 4 and 8 Mb/s) to high speed serial links operating up to 155 Mb/s.

In the VMIC device, up to 2430 channels can be individually "tri-stated" on a per-channel basis, giving the user a control granularity of 64 Kb/s channels. Four output signals (CToO-3) are independently generated by one of the VMIC's internal memories on a per-channel basis (64 Kb/s granularity) to control time-slot access on the parallel bus. This allows other integrated circuits to share the same parallel bus in order to get access to the high speed serial link 29 (up to 155 Mb/s).

The above features allow the implementation of "ADD/DROP" functions at up to 155 Mb/s rates in both point-to-point (star) or ring architectures. As an example (FIG. 3), another device called TPI 1 can be connected to the same parallel bus (19.44 Mb/s, in this example) to assemble and insert ATM cells into the high speed time division multiplex serial link allowing the implementation of a "Hybrid Mux" concept where delay sensitive (from the VMIC) information such as voice and video conference can be combined on the same high speed TDM link with delay non-sensitive data such as video playback or raw data (e.g. asynchronous information from an external buffer).

Similar implementations employing the "Hybrid Mux" concept are provided by Iso-Ethernet (16 Mb/s) and FDD1-2 (100 Mb/s).

We claim:

1. An interface device serving as a bridge between a telephone-based bus with a plurality of TDM channels and a high speed synchronous digital network and providing per channel direction control to permit mixed data, voice, and video signals to be exchanged between the telephone bus and the high speed synchronous digital network, comprising:

a serial port for connection to the telephone bus;

bidirectional serial-to-parallel/parallel-to-serial converter means connected to said serial port;

a port for connection to a high speed framer that assembles frames for said high speed synchronous digital network, said port for connection to a high speed framer being a parallel port for direct connection to a parallel backplane of the high speed framer over a parallel bus;

a rate converter circuit provided between said bidirectional converter means and said parallel port, said rate converter circuit including time-slot interchange means adapted to permit rate adaptation with constant throughput delay and switching between said TDM channels; and a microprocessor controlling time slot assignments in said time-slot interchange means.

2. An interface device as claimed in claim 1, wherein it maps narrowband channels to accommodate required bandwidth.

3. An interface device as claimed in claim 1, wherein said rate converter comprises a plurality of memory modules for buffering TDM frames.

4. An interface device as claimed in claim 1, further comprising a control output port, and means for generating control signals thereon to control time-slot access on the parallel bus with N×64 granularity.

5. An interface device as claimed in claim 4, wherein the channels appearing on the parallel port for connection to the high speed data network can be tri-stated with N×64 granularity.

6. An interface device as claimed in claim 1, further comprising a timing circuit adapted to receive reference timing signals from said high speed framer.

7. An interface device as claimed in claim 1, connected to a high speed synchronous digital network through a high speed framer, said high speed framer having a parallel backplane, wherein a parallel bus is connected between said parallel port and said parallel backplane, and a telephone-based bus with a plurality of TDM channels is connected to said serial port.

8. An interface device serving as a bridge between a telephone-based bus with a plurality of TDM channels and a high speed synchronous digital network and providing per channel direction control to permit mixed data, voice, and video signals to be exchanged between the telephone bus and the high speed synchronous digital network, comprising:

a serial port for connection to the telephone bus;

bidirectional serial-to-parallel/parallel-to-serial converter means connected to said serial port;

a port for connection to a high speed framer connected to said high speed synchronous digital network, said port for connection to a high speed framer being a parallel port for direct connection to a parallel backplane of the high speed framer over a parallel bus;

a rate converter circuit provided between said bidirectional converter means and said parallel port, said rate converter circuit including time-slot interchange means adapted to permit rate adaptation with constant throughput delay and switching between said TDM channels;

a microprocessor controlling said time-slot interchange means; and a control output port generating output signals on a per channel basis to control time slot access of other devices connected to said parallel bus and allow such devices to share access to the high speed synchronous digital network.

9. An interface device as claimed in claim 8 further comprising an asynchronous device connected to said parallel bus receiving said output signals and sharing access to said high speed digital network with said interface device.

10. An interface device as claimed in claim 9, characterized in that signalling and/or data transfers take place through said asynchronous device and voice/video transfers take place through said interface device.

\* \* \* \* \*